United States Patent [19]

Hasegawa et al.

[11] Patent Number: 4,767,113
[45] Date of Patent: Aug. 30, 1988

[54] SHEET FILM FEEDER

[75] Inventors: Kiyoshi Hasegawa, Ootawara; Yutaka Seko, Zama, both of Japan

[73] Assignee: Kabushiki Kaisha Toshiba, Kawasaki, Japan

[21] Appl. No.: 936,743

[22] Filed: Dec. 2, 1986

[30] Foreign Application Priority Data

Dec. 2, 1985 [JP] Japan .................. 60-270901

[51] Int. Cl.⁴ .............................................. B65H 5/22
[52] U.S. Cl. .......................................... 271/3; 271/5; 271/31.1; 271/107; 271/265
[58] Field of Search ............................ 271/5, 3, 11–14, 271/107, 31.1, 265

[56] References Cited

U.S. PATENT DOCUMENTS

| 3,210,072 | 10/1965 | Baker | 271/31.1 |
| 4,206,465 | 6/1980 | Tamoto | 271/107 X |
| 4,509,736 | 4/1985 | Stahl | 271/107 X |
| 4,659,929 | 4/1987 | Fujiwara | 271/107 X |

Primary Examiner—Richard A. Schacher
Attorney, Agent, or Firm—Finnegan, Henderson, Farabow, Garrett and Dunner

[57] ABSTRACT

A sheet film feeder according to the present invention is incorporated in an X-ray photographing apparatus and feeds a sheet film from an unphotographed film housing magazine to a sheet film holder at a waiting position. A suction mechanism for sucking an unphotographed film is provided to the sheet film feeder. In addition, the feeder has a transportation apparatus for transporting the suction mechanism from the unphotographed film housing magazine to the sheet film holder, and a rotation apparatus for rotating the suction mechanism through approximately 90° when the suction mechanism is transported from the unphotographed film housing magazine to the sheet film holder. Therefore, the suction mechanism is rotated approximately 90° and transported from the magazine to the holder. For this reason, the unphotographed film is rotated from the vertical to horizontal state and fed to the holder without damage.

9 Claims, 5 Drawing Sheets

SHEET FILM FEEDER

BACKGROUND OF THE INVENTION

The present invention relates to an apparatus, incorporated in an X-ray photographing apparatus, for feeding a sheet film and, more particularly, to a sheet film feeder for feeding a sheet film from a magazine, which houses unphotographed sheet film, to a sheet film holder which is movable to a photographing position.

In an X-ray photographing apparatus, a sheet film feeder and a sheet film holder, which moves between a waiting position and a photographing position, are provided. During X-ray photographing, a sheet film is fed from the unphotographed film housing magazine to the sheet film holder at the waiting position by the sheet film feeder. The sheet film holder which has received the sheet film at the waiting position holds the sheet film and is moved to the photographing position. X-rays, radiated from an X-ray tube, pass through a patient, and internal portions of the patient are imaged on the sheet film. When this X-ray radiation is terminated, the sheet film holder is returned from the photographing position to the waiting position. The photographed sheet film is taken from the sheet film holder and housed in the photographed film housing magazine. Thus, one X-ray photographing cycle is completed.

In the above X-ray photographing apparatus, the sheet film is arranged substantially perpendicular to a moving direction of the sheet film holder and housed in the unphotographed film housing magazine. Therefore, after the sheet film is taken from the unphotographed film housing magazine, it must be rotated substantially through 90° and moved to the sheet film holder.

For this reason, in a conventional sheet film feeder disclosed in Japanese Patent Disclosure (Kokai) No. 55-33137, a plurality of pairs of rollers for clamping and moving the sheet film are arranged between the unphotographed film housing magazine and the sheet film holder. The sheet film taken from the magazine is sequentially transported from one pair of rollers to another. Thus, the sheet film is rotated through about 90° and fed to the sheet film holder.

At this time, in order to transport the sheet film properly from one pair of rollers to another, all the pairs of rollers must be controlled to rotate at an equal rotating speed. A feed-back control means may be used to detect rotating speeds of each roller pair and to maintain them at a predetermined rotating speed. However, not one but a plurality of pairs of rollers must be simultaneously feedback-controlled. For this reason, a very complex apparatus is required to realize this feedback control. Furthermore, a delay of response occurs, i.e., each pair of rollers may require a time longer than a predetermined time to attain a target speed. In this case, since the rotating speed of each pair of rollers is not equal to each other, the sheet film is sometimes loosened when it is transported from one pair of rollers to another. Because of this loosening, the sheet film is bent and damaged.

SUMMARY OF THE INVENTION

It is an object of the present invention to provide a sheet film feeder with a simple structure, in which a sheet film is not bent when it is fed.

A sheet film feeder according to the present invention is incorporated in an X-ray photographing apparatus, and feeds a sheet film from an unphotographed film housing magazine to a sheet film holder at a waiting position. The sheet film holder holds the sheet film and is moved between an X-ray photographing position and the waiting position for receiving the sheet film. The unphotographed film housing magazine is located perpendicular to a moving direction of the sheet film holder and houses an unphotographed sheet film therein.

The sheet film feeder is provided with a suction mechanism having a suction section for sucking and holding the unphotographed film. Also, a transportation mechanism for transporting the suction mechanism via first, second, and third positions is provided to the sheet film feeder. In this transportation mechanism, when the suction mechanism is transported from the first to second position and stopped thereat, the sheet film in the unphotographed film housing magazine is sucked by the suction section. When the suction mechanism is transported from the second to third position and stopped thereat, suction of the sheet film by the suction mechanism is stopped, the sheet film is received by the sheet film holder, and after that the suction mechanism is transported from the third to first position and stopped thereat. When the suction mechanism is transported from the first to second position and stopped thereat, a supporting mechanism maintains the suction mechanism so that the suction section faces the sheet film in the unphotographed film housing magazine. When the suction mechanism is transported from the second to third position, a rotating apparatus rotates the suction mechanism approximately 90°. In this manner, the suction mechanism itself is rotated approximately 90° and moved from the magazine to the holder. Thus, the unphotographed film is rotated from the vertical to horizontal state and fed to the holder without being bent. In addition, unlike conventional feeders, the sheet film is not fed by rollers, resulting in a simpler structure of the feeder.

DETAILED DESCRIPTION OF THE PREFERRED EMBODIMENTS

Figure 1:
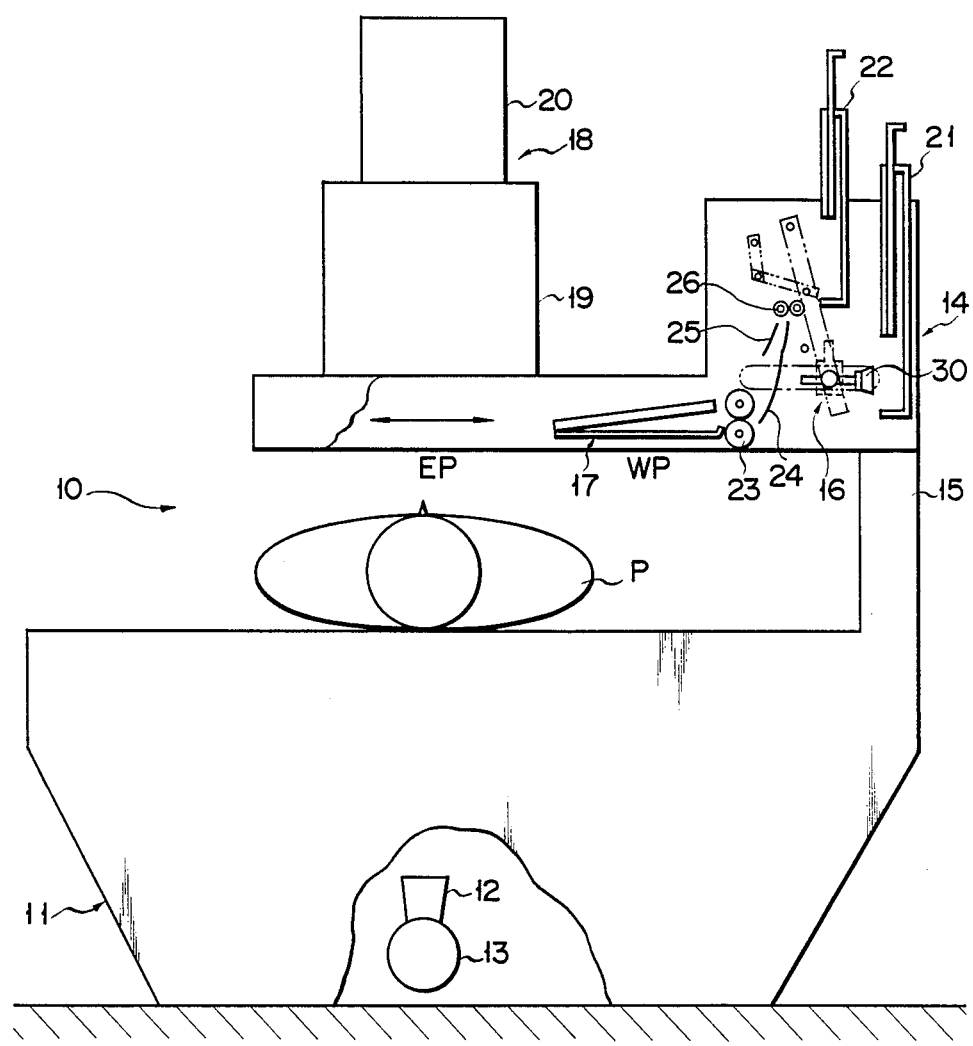
FIG. 1 is a front view of an X-ray photographing apparatus to which a sheet film feeder according to the present invention is adapted.

As shown in FIG. 1, X-ray photographing apparatus 10 is provided with X-ray radiating apparatus 11 for radiating X-rays onto patient P. Patient P lies on the upper surface of apparatus 11. X-ray tube 13, for radiating X-rays onto patient P through diaphragm 12, is provided inside apparatus 11.

Cassetteless spot shot apparatus 14 for setting a sheet film at photographing position EP is also provided to apparatus 10. Apparatus 14 is supported by arm 15 at the side of apparatus 11 and located above patient P. In apparatus 14, the sheet film is set at position EP by sheet film feeder 16 and sheet film holder 17.

Furthermore, television monitoring apparatus 18 for monitoring patient P during X-ray photographing is provided to apparatus 10. Apparatus 18 is located above position EP of apparatus 14 and provided with image intensifier 19 and television camera 20.

Unphotographed film housing magazine 21 for housing an unphotographed sheet film is provided substantially perpendicular to apparatus 14. Also, photographed film housing magazine 22 for housing a photographed film is provided adjacent to magazine 21. Sheet film feeder 16, for feeding the sheet film from magazine 21 to holder 17 at the waiting position WP, is provided. Feeder 16 will be described in detail later with reference to FIGS. 2 and 3.

In apparatus 14, as shown in FIG. 1, holder 17, horizontally moving between waiting position WP for receiving the sheet film and position EP, is provided. Holder 17 includes two plates made of a material with a high X-ray transmitance, e.g., aluminum. These two plates are pivotally connected at the photographing side, so that they can be opened and closed. In holder 17, the two plates are closed to contact and hold the sheet film.

Therefore, the sheet film is taken from magazine 21 and fed to holder 17 by feeder 16. Holder 17 receives the sheet film from feeder 16 in waiting position WP. The sheet film is brought into contact with and held by the two closed plates, and holder 17 is moved from position WP to position EP. When X-rays are radiated from tube 13 through patient P, internal portions of patient P are imaged on the sheet film held by holder 17. Upon termination of X-ray radiation, holder 17 is returned from position EP to position WP.

A pair of rollers 23 is provided between feeder 16 and holder 17. Rollers 23 clamp and feed the sheet film by rotating. Rollers 23 are separated when they are not in operation, and approach each other immediately before clamping the sheet film. Rollers 23 clamp the sheet film and insert it into holder 17 when the sheet film is supplied from feeder 16 to holder 17. Rollers 23 also serve to take the sheet film from holder 17, returned to waiting position WP.

In addition, a feeding mechanism is provided to feed the photographed sheet film to magazine 22. That is, a pair of rollers 26 is provided between rollers 23 and magazine 22. Rollers 26 receive the sheet film supplied from rollers 23 and feed it to magazine 22. In order to feed the sheet film from rollers 23 to rollers 26, movable guide 24 and stationary guide 25, for guiding the sheet film, are provided. Note that guide 24 is moved upward when the sheet film is supplied to holder 17, and moved downward when the photographed film is taken out from holder 17 so as to guide the photographed film toward magazine 22.

Therefore, when X-ray photographing is terminated and holder 17 is returned from position EP to position WP, the photographed film is taken from holder 17 by rollers 23. The photographed film is guided by guides 24 and 25 and moved upward by rollers 23. The photographed film is supplied to rollers 26 and sent to magazine 22 by rollers 26.

Figure 2:
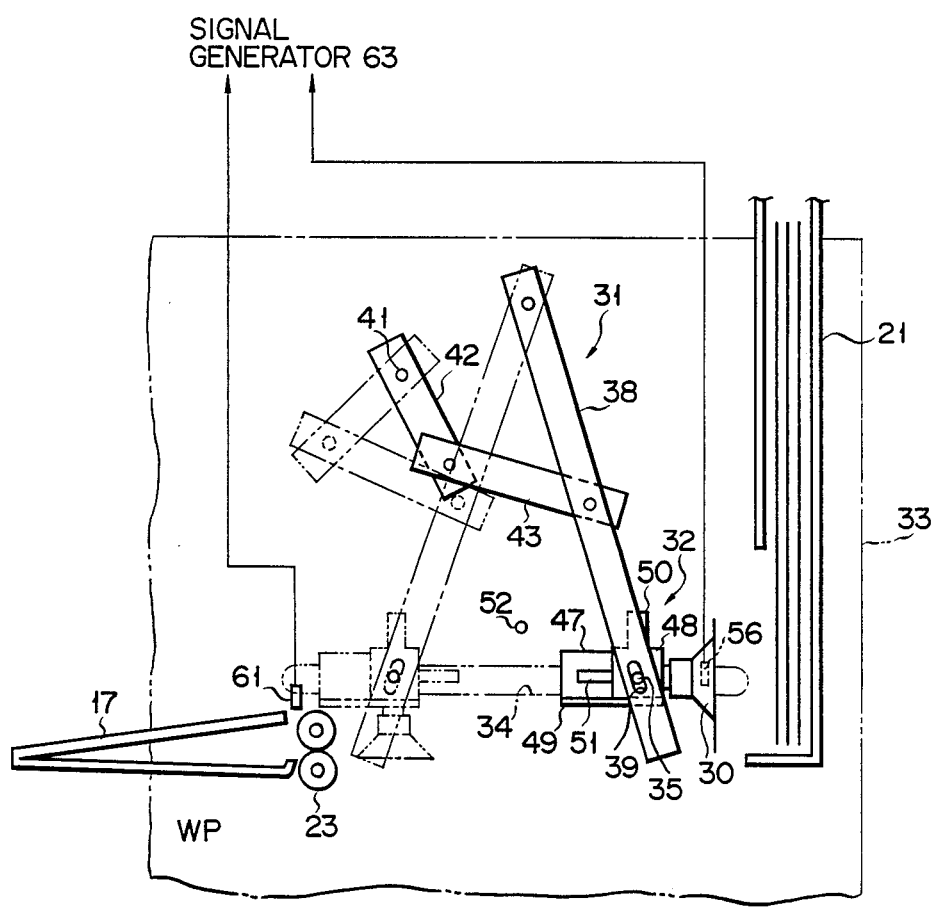
FIG. 2 is an enlarged front view of the sheet film feeder shown in FIG. 1.
Figure 3:
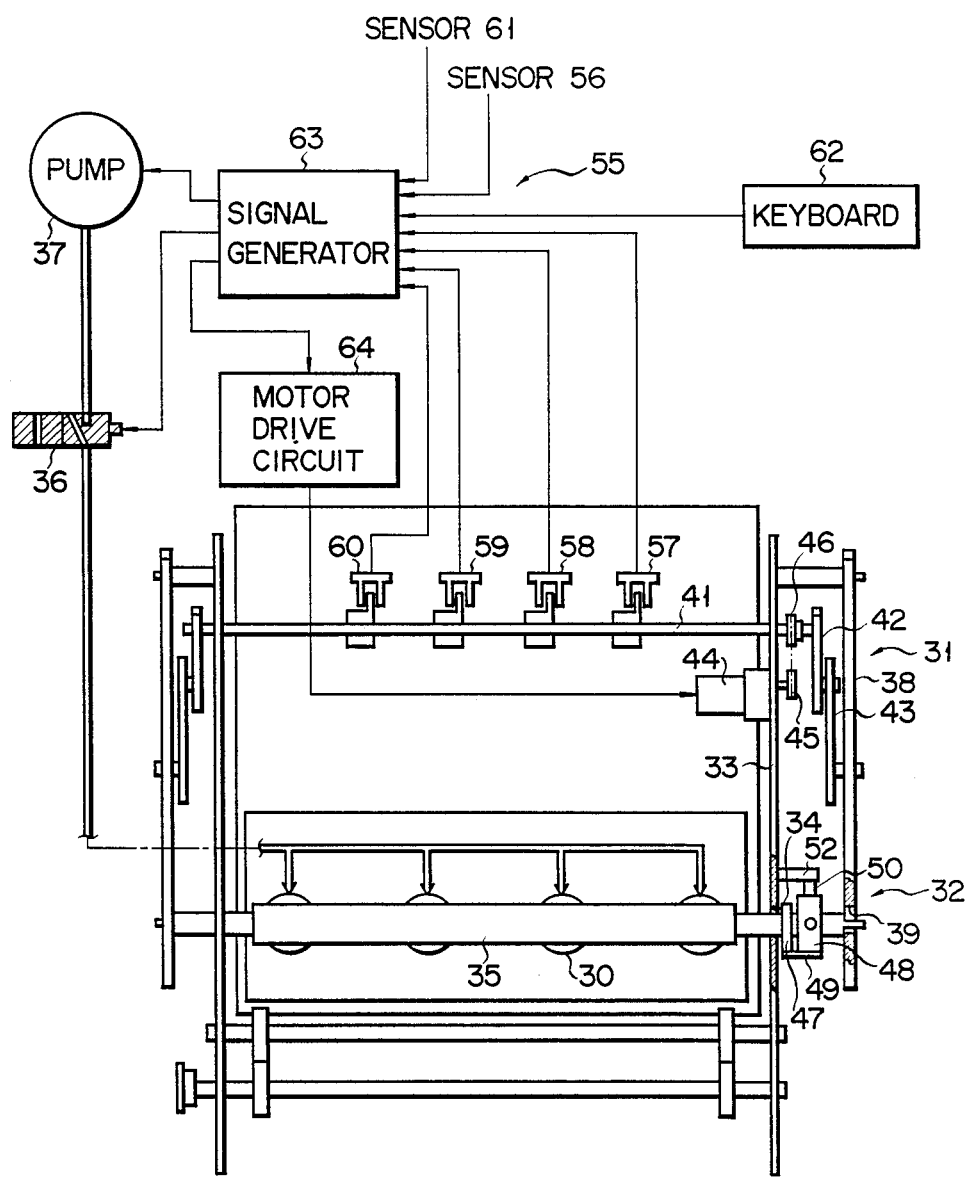
FIG. 3 is a side view of the sheet film feeder including a block diagram of a control apparatus of the sheet film feeder shown in FIG. 2.

As shown in FIGS. 2 and 3, feeder 16 is provided with suction mechanism 30 for sucking the sheet film in magazine 21, transportation mechanism 31 for transporting suction mechanism 30 toward holder 17, and rotation apparatus 32 for rotating suction mechanism 30 during transportation. Therefore, the sheet film is taken from magazine 21, rotated approximately 90°, then fed to holder 17.

A pair of side walls 33 for forming a housing is provided to feeder 16. Each wall 33 has horizontally extending guide grooves 34. As shown in FIG. 3, supporting shaft 35, both ends of which are engaged with guide grooves 34, is provided between walls 33. Four suction mechanisms 30 are mounted on shaft 35. Each mechanism 30 is connected to vacuum pump 37 through electromagnetic valve 36. When pump 37 is in operation and valve 36 is opened, mechanisms 30 suck the sheet film.

As shown in FIG. 2, a lever crank mechanism is provided as apparatus 31. The proximal end of lever 38 is rotatably supported by a shaft fixed to walls 33. Slit 39 is formed in the distal end of lever 38, and the two ends of shaft 35 are engaged with slit 39. Therefore, shaft 35 is allowed to slightly move in slit 39 along the extending direction of lever 38. For this reason, when lever 38 is swung, shaft 35 is moved horizontally along grooves 34.

Furthermore, rotating shaft 41 is provided between walls 33. The proximal end of crank 42 is fixed to the end of shaft 41 projecting from right wall 33. The proximal end of connecting rod 43 is rotatably connected to the distal end of crank 42. An intermediate portion of lever 38 is rotatably connected to the distal end of rod 43. In addition, motor 44 is provided to one wall 33 to rotate shaft 41. A chain is wound around sprocket 45, provided to the drive shaft of motor 44, and sprocket 46, provided to shaft 41. Therefore, when motor 44 is actuated, crank 42 is rotated clockwise and lever 38 is swung clockwise, as shown in FIG. 2. Shaft 35 is moved horizontally along hole 34, and mechanisms 30, mounted on shaft 35, are transported from magazine 21 toward holder 17.

Apparatus 32 for rotating suction mechanisms 30 during transportation of mechanisms 30 is arranged as follows. Plate 47 and block 48 are fixed to the end of shaft 35. Leaf spring 49 is provided to the lower end of plate 47. Spring 49 abuts against the lower surface of rectangular block 48. Dogs 50 and 51 are respectively provided to side and upper surfaces of block 48. Therefore, when mechanisms 30 are transported, i.e., shaft 35 is moved along hole 34, dog 50 of block 48 is caused to abut against pin 52 to rotate block 48. Thus, shaft 35 and mechanisms 30 are rotated. In this case, when block 48 begins to rotate, the corner of block 48 is biased by spring 49 and a rotating force is restricted. Therefore, rotation of block 48 is not easily started. On the other hand, once block 48 is rotated by the force stronger than a predetermined one, the corner is rotated to deflect spring 49. The corner is biased in a rotating direction to accelerate the rotating force. The side surface next to the lower surface of block 48 is brought into contact with spring 49, thereby stopping rotation of block 48. For this reason, once dog 50 abuts against pin 52 and is rotated, block 48 is rotated until the side surface next to the lower surface of block 48 contacts spring 49. More specifically, block 48 is rotated approximately 90°. Therefore, when mechanisms 30 are stopped at magazine 21, they are maintained to face the sheet film. When mechanisms 30 are stopped at holder 17, they are supported so that the sheet film is inserted between the two plates of holder 17.

In addition, in order to actuate lever 38 and suction mechanisms 30 at a proper timing during the feed of the sheet film, actuating apparatus 55 is provided to the system. Apparatus 55 actuates motor 44 for swinging lever 38 and valve 36 communicated to mechanisms 30.

As shown in FIG. 3, various types of sensors are provided to the system. Pressure sensitive sensor 56 is provided to mechanisms 30. Sensor 56 detects that mechanisms 30 contact the sheet film in magazine 21, and generates a film detection signal. In order to detect the transportation positions of mechanisms 30, i.e., a swing position of lever 38, sensors 57 to 60 are provided on shaft 41. When mechanisms 30 are transported from magazine 21 to holder 17, sensor 57 to 60 detect a rotating angular interval of shaft 41 to generate a detection signal. More specifically, sensor 57 detects the timing when mechanisms 30 are stopped for the first time, and generates a film separating position detection signal. Therefore, when more than two of the sheet films are sucked by mechanisms 30, mechanisms 30 are slightly transported and stopped, thereby separating the extra sheet film and returning it inside magazine 21. In addition, sensor 58 detects the timing when mechanisms 30 are transported toward holder 17 and stop suction of the sheet film, and generates a suction stop position detection signal. Sensor 59 detects the timing when mechanisms 30 are transported toward holder 17 and transportation of mechanisms 30 is stopped, and generates a transportation stop position detection signal. Sensor 60 detects the timing when transportation of mechanisms 30 is stopped at a home position during their return movement toward magazine 21, and generates a home position detection signal. In addition, reflective optical sensor 61 is provided between rollers 23 and holder 17. Sensor 61 detects that the sheet film is passing between rollers 23 and holder 17, and generates a film-passing detection signal.

Keyboard 62 and signal generator 63 are provided to actuating apparatus 55. Motor drive circuit 64 for supplying electric current to motor 44 is provided. A command input by an operator is supplied from key board 62 to signal generator 63. Generator 63 receives signals from sensors 56 to 60, generates a normal rotation signal or a reverse rotation signal corresponding to the received signals, and supplies it to circuit 64. When the normal rotation signal is supplied to circuit 64, motor 44 is rotated in the normal direction to rotate lever 38 in the clockwise direction in FIG. 2, so that mechanisms 30 are transported toward holder 17. When the reverse rotation signal is supplied to circuit 64, motor 44 is reversely rotated to rotate lever 38 in the counterclockwise direction in FIG. 2, so that mechanisms 30 are transported to magazine 21. Corresponding to signals from sensors 56 and 58, generator 63 generates a valve open or close signal and supplies it to valve 36. When the open signal is supplied to valve 36, valve 36 is opened, and mechanisms 30 are communicated to pump 37 and suck the sheet film. When the close signal is supplied to valve 36, valve 36 is closed and mechanisms 30 stop suction of the sheet film. Note that this signal generator 63 is realized by, e.g., a microcomputer.

Figure 4A:
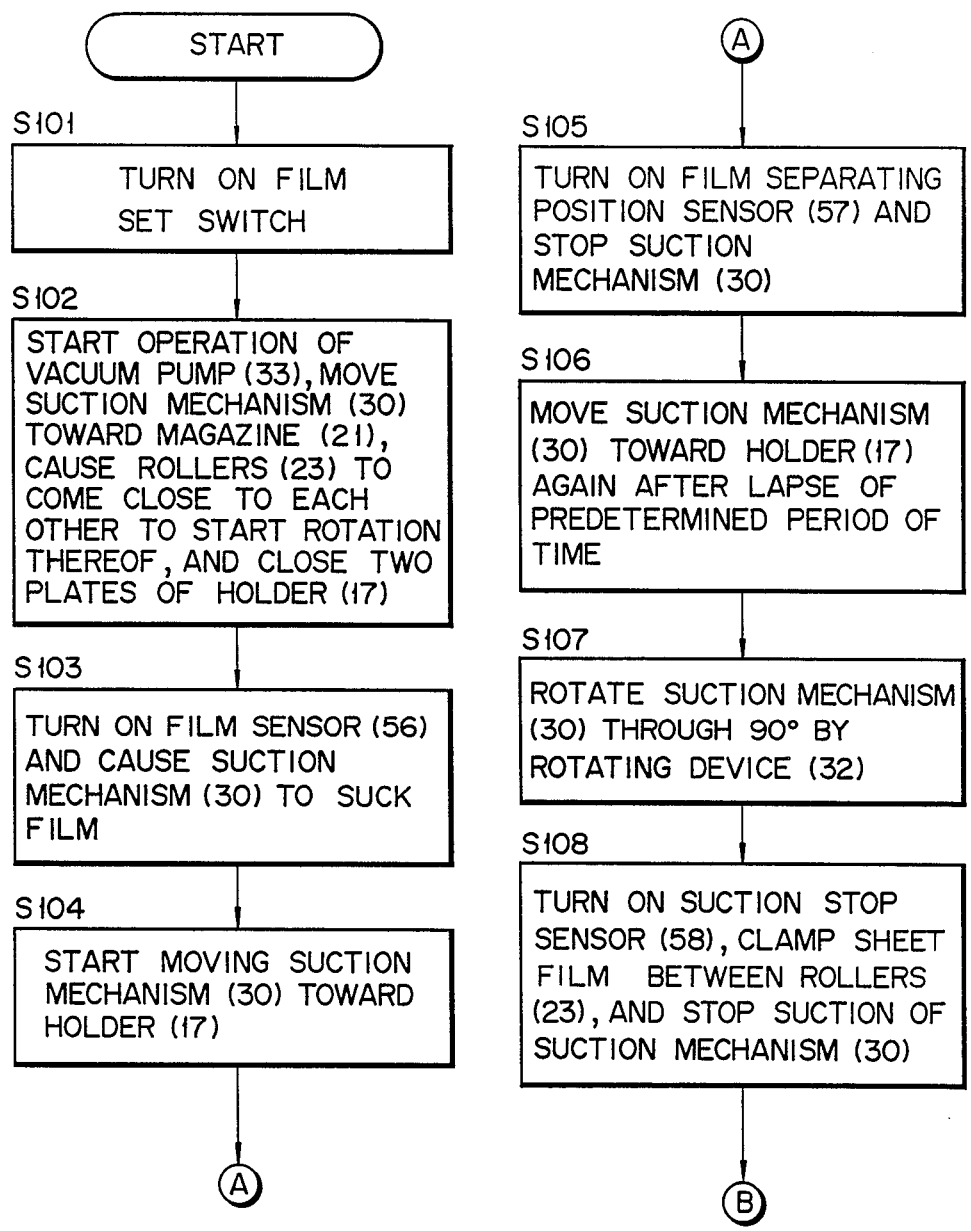
FIG. 4A and 4B are a flow chart of the control apparatus of the sheet film feeder.
Figure 4B:
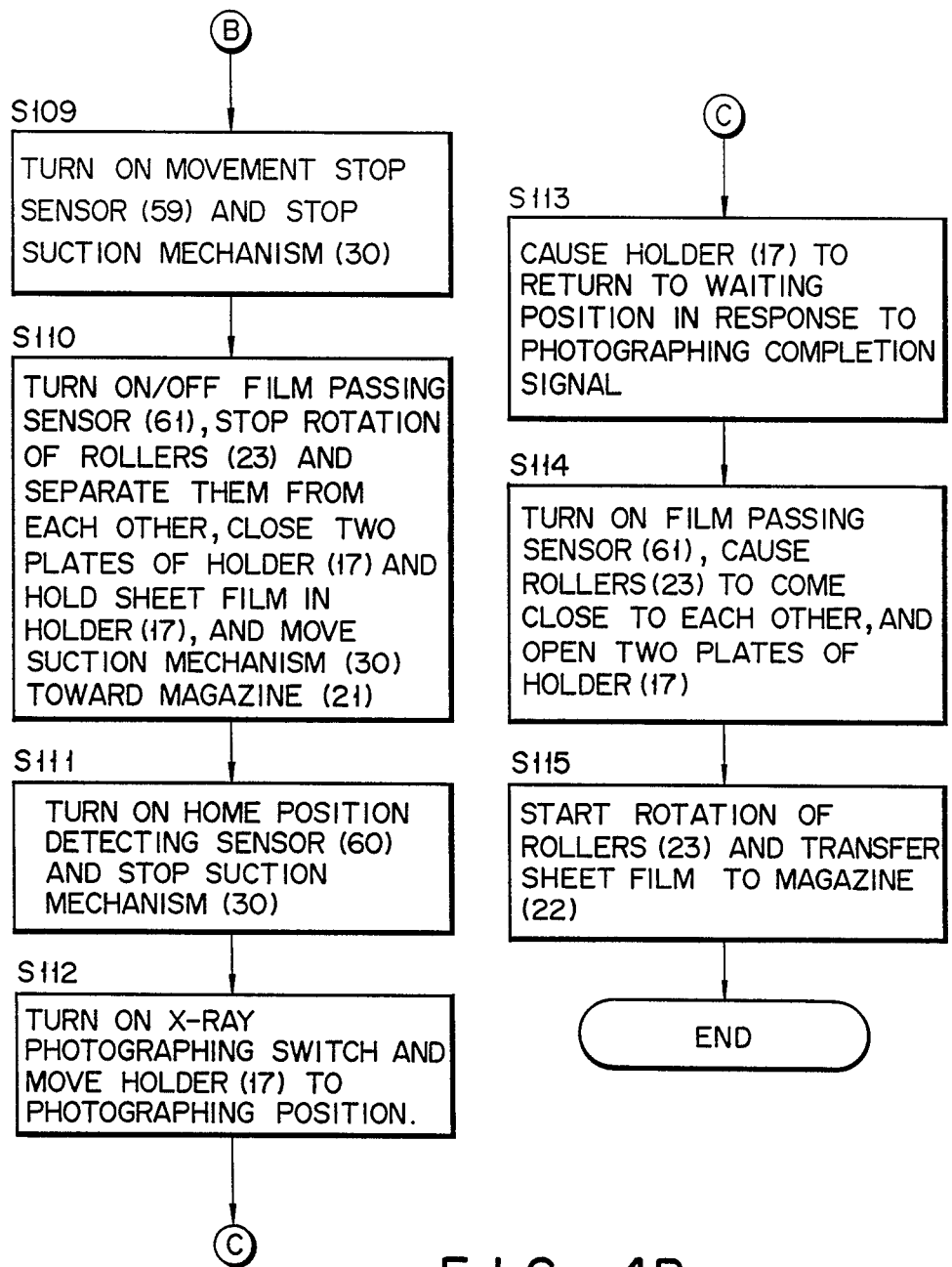

An operation of the sheet film feeder according to the present invention will now be described in detail with reference to the flow chart in FIG. 4.

In step 101, a film set switch of board 62 for starting feed of the sheet film is turned on by an operator, and a start signal is supplied to generator 63. An operation signal is generated by generator 63 and supplied to pump 37. A reverse rotation signal is generated by generator 63 and supplied to circuit 64. An operation signal is generated by generator 63 and supplied to rollers 23. An open signal for the plates of holder 17 is generated by generator 63 and supplied to holder 17.

In step 102 pump 37 starts operation. Motor 44 is reversely rotated to transport mechanisms 30 from the home position toward magazine 21. Simultaneously, rollers 23 are caused to come close to each other and start rotation. The two plates of holder 17 are opened.

In step 103, when mechanisms 30 approach the sheet film, film sensor 56 is turned on and supplies a film detection signal to generator 63. A suction start signal or a valve open signal is generated by generator 63 and supplied to valve 36. Accordingly, valve 36 is opened, and mechanisms 30 start to suck the sheet film. Simultaneously, a normal rotation signal is generated by generator 63 and supplied to circuit 64. In step 104 transportation of mechanisms 30 toward holder 17 is started.

In step 105, when mechanisms 30 are slightly transported, film separating position sensor 57 is turned on and supplies a film separating position detection signal to generator 63. A rotation stop signal is generated by generator 63 and supplied to circuit 64. Accordingly, transportation of mechanisms 30 is stopped. Thus, if an extra sheet film is sucked by mechanisms 30, this extra sheet film is removed.

In step 106, when a predetermined time (about one second) is passed, a normal rotation signal is generated by generator 63 and supplied to circuit 64. Therefore, transportation of mechanisms 30 toward holder 17 is started again.

In step 107, mechanisms 30 are rotated 90° by rotation apparatus 32 during this transportation. Therefore, the sheet film is rotated from the vertical to horizontal state.

In step 108, when mechanisms 30 are transported by a predetermined distance, suction stop position sensor 58 is turned on and supplies a suction stop position detection signal to generator 63. A suction stop signal or a valve close signal is generated by generator 63 and supplied to valve 36. Therefore, valve 36 is closed and mechanisms 30 stop suction of the sheet film. Simultaneously, rollers 23 clamp the sheet film and feed it to holder 17.

In step 109, transportation stop position sensor 59 is turned on and supplies a transportation stop position detection signal to generator 63. A rotation stop signal is generated by generator 63 and supplied to circuit 64. Therefore, transportation of mechanisms 30 is stopped.

In step 110, film-passing sensor 61 is turned on/off and supplies a film-passing detection signal to generator 63. A roller stop signal is generated by generator 63 and supplied to rollers 23. Simultaneously, a close signal for the plates of holder 17 is generated by generator 63 and supplied to holder 17. A reverse signal is generated by generator 63 and supplied to circuit 64. Accordingly, rollers 23 stop rotation and are separated from each other. The two plates of holder 17 are closed, and the sheet film is held by holder 17. Mechanisms 30 are then transported toward magazine 21.

In step 111, home position sensor 60 is turned on and supplies a home position detection signal to generator 63. A rotation stop signal is generated by generator 63 and supplied to circuit 64. Transportation of mechanisms 30 is stopped at the home position.

In step 112, an X-ray radiation switch of board 62 for starting X-ray radiation is turned on by the operator and an X-ray radiation start signal is supplied to generator 63. A holder transportation signal is generated by generator 63 and supplied to holder 17. Therefore, holder 17 is transported to the photographing position.

In step 113, an X-ray radiation completion signal is generated from X-ray radiating apparatus 11 and supplied to generator 63. A holder return signal is generated by generator 63 and supplied to holder 17. Therefore, holder 17 is returned from photographing position EP to waiting position WP.

In step 114, sensor 61 is turned on and supplies a film-passing detection signal to generator 63. A roller-approaching signal is generated by generator 63 and supplied to rollers 23. Simultaneously, an open signal for the plates of holder 17 is generated by generator 63 and supplied to holder 17. Therefore, rollers 23 approach each other, and the two plates of holder 17 are opened. Simultaneously, in step 115, rollers 23 start rotation to take the sheet film from holder 17. Rollers 26 start operation and the sheet film is fed to photographed film housing magazine 22. Thus, one X-ray photographing cycle is completed.

As has been described above, according to the present invention, suction mechanisms 30, sucking the sheet film, are transported from unphotographed film housing magazine 21 to sheet film holder 17 by transportation apparatus 31, while suction mechanisms 30 are rotated about 90° by rotation mechanisms 32. Therefore, the sheet film is sucked by mechanisms 30, while the sheet film is rotated 90° to be fed to holder 17. For this reason, even when magazine 21 is provided perpendicular to the transportation direction of holder 17, the sheet film can be fed without bending. In addition, unlike conventional feeders, the sheet film feeder according to the present invention does not require a plurality of pairs of rollers, resulting in a simple structure of the feeder. Furthermore, the sheet film feeder according to the present invention can be incorporated in an X-ray photographing apparatus that rotates around a patient for tomography.

What is claimed is:

1. A sheet film feeder incorporated in an X-ray photographing apparatus for feeding a sheet film from an unphotographed film housing magazine to a sheet film holder located at a waiting position, said sheet film holder holding the sheet film and being moved between an X-ray photographing position for receiving the sheet film, and said unphotographed film housing magazine being oriented perpendicular to a moving direction of the sheet film holder and housing an unphotographed sheet film, the sheet film feeder comprising:
   a suction mechanism having a suction section for sucking and holding the unphotographed sheet film;
   transportation means for transporting said suction mechanism between first, second, and third linearly spaced positions, said suction mechanism being transported from the first position to the second position and stopped thereat and the sheet film in said unphotographed film housing magazine being sucked by said suction section while said suction section is at said second position, said suction mechanism then being transported from the second position to the third position and stopped thereat and suction of the sheet film by said suction mechanism being stopped and the sheet film being received by said sheet film holder while said suction section is at said third position, and said suction mechanism then being transported from the third position to the first position and stopped thereat; and
   rotation means for orienting said suction mechanism so that said suction section faces the sheet film inside said unphotographed film housing magazine when said suction mechanism is transported from the first position to the second position and stopped thereat, and for rotating said suction mechanism approximately 90° as said suction mechanism is transported from the second position to the third position.

2. A feeder according to claim 1, wherein said transportation means further includes:
   a sensor for detecting that said suction mechanism is stopped at the first position and generating a first signal, for detecting that said suction mechanism is stopped at the second position and generating a second signal, and for detecting that said suction mechanism is stopped at the third position and generating a third signal;
   a drive mechanism for providing normal and reverse rotation forces;
   link means, connecting said drive mechanism to said suction mechanism, for moving said suction mechanism between said first, second, and third positions in response to the rotational forces of said drive mechanism; and
   a signal generator, responsive to said sensor for selectively generating a normal rotational signal and a reverse rotational signal to cause said drive mechanism to respectively provide the normal rotation force and the reverse rotation force, said signal generator generating the reverse rotation signal so that said suction mechanism is transported from the first position to the second position in response to the first signal, generating the normal rotation signal so that said such mechanism starts suction and is transported from the second position to the third position in response to the second signal, and generates the reverse rotation signal so that said suction mechanism stops suction and is transported from the third position to the first position in response to the third signal.

3. A feeder according to claim 2, wherein said link means includes:
   a lever having proximal and distal ends, said proximal end being rotatably supported at a preselected pivot point, and said suction mechanism being rotatably supported on said lever at said distal end; and
   swing means connecting said lever and said drive mechanism for swinging said lever about said pivot point in response to the rotational forces of said drive mechanism so that said suction mechanism is transported between the first, second, and third positions.

4. A feeder according to claim 3, wherein said swing means includes:
   a crank having proximal and distal ends, said proximal end of said crank being rotated by said drive mechanism; and
   a connecting rod having proximal and distal ends, said proximal end of said connecting rod being rotatably connected to said distal end of said crank, and said distal end of said connecting rod being rotatably connected to an intermediate portion of said lever;
   whereby when said drive mechanism is actuated, said lever is swung and said suction mechanism is transported between the first, second, and third positions.

5. A feeder according to claim 3, further comprising a housing including a guide groove extending from said unphotographed film housing magazine along a direction toward said sheet film holder, wherein said transportation means further includes a shaft fixed to said suction mechanism and rotatably connected to said distal end of said lever, said shaft having an end inserted in said guide groove.

6. A feeder according to claim 5, wherein said rotation means includes a rectangular block fixed to said shaft and supporting said suction mechanism, a dog provided on at least one side surface of said block, and dog-engaging means provided on said housing for engaging said dog and rotating said suction mechanism as said suction mechanism is transported between the second and third positions.

7. A feeder according to claim 6, wherein said dog engaging means includes a pin fixed to said housing between the second and third positions.

8. A feeder according to claim 6, wherein said rotation means further includes a leaf spring contacting said block to bias said block against rotation.

9. A feeder according to claim 5, wherein said rotation means includes:
a rectangular block fixed to said shaft and supporting said suction mechanism, said block having first, second, third, and fourth faces substantially parallel to said shaft, said first and fourth faces being substantially orthogonal;
two dogs, each fixed to one of said third and fourth faces of said block;
a pin fixed to said housing and positioned to abut one of said dogs and rotate said suction mechanism approximately 90° as said suction mechanism is transported between the second and third positions; and
a leaf spring fixed to said shaft, said leaf spring being positioned and oriented to contact one of said first and second faces of said block and restrict further rotation of said block after said pin has rotated said block as said suction mechanism is transported between the second and third positions.

* * * * *